United States Patent
Trainoff

(10) Patent No.: US 11,674,873 B2
(45) Date of Patent: Jun. 13, 2023

(54) DIFFERENTIAL VISCOMETER WITH SOLVENT COMPRESSIBILITY CORRECTION

(71) Applicant: Wyatt Technology Corporation, Goleta, CA (US)

(72) Inventor: Steven P. Trainoff, Santa Barbara, CA (US)

(73) Assignee: WYATT TECHNOLOGY CORPORATION, Goleta, CA (US)

( * ) Notice: Subject to any disclaimer, the term of this patent is extended or adjusted under 35 U.S.C. 154(b) by 0 days.

(21) Appl. No.: 16/917,831

(22) Filed: Jun. 30, 2020

(65) Prior Publication Data

US 2020/0333231 A1    Oct. 22, 2020

Related U.S. Application Data

(63) Continuation of application No. 15/736,291, filed as application No. PCT/US2016/041649 on Jul. 8, 2016, now Pat. No. 10,697,878.

(Continued)

(51) Int. Cl.
*G01N 11/08* (2006.01)
*G01N 30/62* (2006.01)
(Continued)

(52) U.S. Cl.
CPC ............. *G01N 11/08* (2013.01); *G01N 30/32* (2013.01); *G01N 30/62* (2013.01); *G01N 30/64* (2013.01);
(Continued)

(58) Field of Classification Search
CPC ........ G01N 11/08; G01N 30/32; G01N 30/62; G01N 30/64; G01N 2030/625; G01N 2030/626
(Continued)

(56) References Cited

U.S. PATENT DOCUMENTS 3,808,877 A * 5/1974 Blair ................ G01N 11/08
73/54.06
4,165,632 A * 8/1979 Weber ............ A61B 5/02035
128/898

(Continued)

OTHER PUBLICATIONS

Max A. Haney: "The differential viscometer. I. A new approach to the measurement of specific viscosities of polymer solutions", Journal of Applied Polymer Science, vol. 30, No. 7, Jul. 1, 1985 (Jul. 1, 1985), pp. 3023-3 (Year: 1985).*

(Continued)

*Primary Examiner* — Alexander A Mercado
*Assistant Examiner* — Monica S Young
(74) *Attorney, Agent, or Firm* — Leonard T. Guzman

(57) ABSTRACT

An improved version of the capillary bridge viscometer that compensates for the effect of solvent compressibility is disclosed. A novel, yet simple and inexpensive modification to a conventional capillary bridge viscometer design can improve its ability to reject pump pulses by more than order of magnitude. This improves the data quality and allows for the use of less expensive pumps. A pulse compensation volume is added such that it transmits pressure to the differential pressure transducer without sample flowing there through. The pressure compensation volume enables the cancellation of the confounding effects of pump pulses in a capillary bridge viscometer.

3 Claims, 17 Drawing Sheets

Related U.S. Application Data

(60) Provisional application No. 62/190,171, filed on Jul. 8, 2015.

(51) Int. Cl.
  G01N 30/32 (2006.01)
  G01N 30/64 (2006.01)
  G01N 30/26 (2006.01)

(52) U.S. Cl.
  CPC ....... *G01N 30/26* (2013.01); *G01N 2030/625* (2013.01); *G01N 2030/626* (2013.01)

(58) Field of Classification Search
  USPC .............................................. 73/54
  See application file for complete search history.

(56) References Cited

U.S. PATENT DOCUMENTS

| | | | | |
|---|---|---|---|---|
| 4,463,598 | A * | 8/1984 | Haney | G01N 11/08 73/54.09 |
| 7,213,439 | B2 * | 5/2007 | Trainoff | G01N 11/08 73/1.88 |
| 7,331,218 | B2 * | 2/2008 | Trainoff | G01N 11/08 73/54.05 |
| 2003/0203504 | A1 * | 10/2003 | Hefti | B01L 3/5025 422/50 |
| 2006/0213256 | A1 * | 9/2006 | Trainoff | G01N 11/08 73/54.06 |
| 2007/0079659 | A1 * | 4/2007 | Titterton | G01N 11/08 73/736 |
| 2008/0245133 | A1 * | 10/2008 | Titterton | G01N 30/74 73/54.01 |
| 2014/0144214 | A1 | 5/2014 | Nicholls et al. | |

OTHER PUBLICATIONS

Blom, M. & R, Oever & Claes, P. & Verboom, Willem & O'Donohue, Steve & Van den Berg, Albert & Reinhoudt, David. (2005). A micro differential viscosity detector for polymer separation system. International Journal of Computer Vision—IJCV. (Year: 2005).*

International Search Report PCT US2016041649, dated Sep. 14, 2016.

Written Opinion PCTUS2016041649, dated Sep. 14, 2016.

Fang Guiyin, Repair Manual for Refrigeration and Air Conditioning Equipment, Jan. 31, 2015, pp. 75-78, Electric Power Press, Beijing, China.

China National Intellectual Property Administration Search Report for Chinese Patent Application 2016800371475, Aug. 12, 2020.

M.D.H et al., Process Analysis of Rubber Injection Molding-Model and Simulation—Rubber Reference Materials, Dec. 31, 1996, p. 61, vol. 26, issue 4.

Japan Patent Office Notice of Rejection, dated Aug. 18, 2020.

* cited by examiner

DIFFERENTIAL VISCOMETER WITH SOLVENT COMPRESSIBILITY CORRECTION

PRIORITY

This application is a continuation of U.S. patent application Ser. No. 15/736,291, filed Dec. 13, 20179.

BACKGROUND

To understand the role that pump pulses play in the measurement of specific viscosity it is instructive to first consider the single capillary viscometer as shown in FIG. 1. A pump 101 draws fluid from a reservoir 102 and passes it through a sensing capillary 103. A differential transducer 104 measures the pressure across the capillary. The measured pressure is proportional to the flow rate and the sample viscosity. If one first flows solvent through the capillary and measures the pressure $P_0$, and subsequently injects a sample, the specific viscosity is simply $$\eta_{sp} = P_s/P_0 \qquad (1)$$

If the sample composition varies over in time, as is the case with the elution of a chromatographic separation, the specific viscosity as a function of time is simply $$\eta_{sp}(t) = P_s(t)/P_0.$$

A problem arising from such a flowing system is that if the pump is not perfectly stable, pressure pulses appear identical to changes in the sample viscosity. Since the output of the conventional viscometer is directly proportional to the pressure, the sensitivity of such a device is limited by the quality of the pump used. High quality chromatography solvent delivery systems commonly provide solvent with pressure pulses less than 0.1%, so the ability to measure specific viscosity is limited to this level. However, high quality viscometers, such as the ViscoStar® (Wyatt Technology Corporation, Santa Barbara, Calif.) are able to routinely measures specific viscosity down to 1E-6, which is three orders of magnitude smaller, and therefore the improved sensitivity of measurements from high quality viscometers such as these is lost in the noise of the pump pulses from chromatography systems employing even the finest pumps available.

As an example of the output of a single capillary viscometer consider the chromatographic elution shown in FIG. 2. Two mg of Bovine Serium Albumen (BSA) was injected on a protein column (Wyatt Technology, Santa Barbara, Calif.) at a flow rate of 0.6667 ml/min, and the solvent was phosphate buffered saline. The pump was an Agilent® 1100 series pump (Agilent Technologies, Santa Clara, Calif.). As the detector is positioned after the column, the pump pulses are further dampened. In line following the viscometer was a Optilab® rEX concentration detector (Wyatt Technology Corporation, Santa Barbara, Calif.) that measured the differential refractive index 201 of the resulting elution. In spite of the fact that a high quality chromatography pump was used, the pump pulses limit the performance as is evident in the viscometry data 202.

One way to ameliorate the problem of pump pulses masquerading as sample peaks is to use a capillary bridge viscometer such as that described by Haney in 1982 in U.S. Pat. No. 4,463,598. The capillary bridge viscometer is a fluid analog of the classical Wheatstone bridge electrical circuit in which four capillaries are connected in a bridge formation along with a large fluid reservoir in one of the lower bridge arms. The delay volume insures that the bridge will go out of balance when a sample is introduced to the bridge. Data can be taken until the sample emerges from the delay column at which time one must wait for the column to refill with solvent before another sample may be injected. The out-of balance pressure is measured by a differential pressure transducer (DP), and the pressure from top to bottom of the bridge is measured by a separate transducer (IP). These two signals can be combined to determine the specific viscosity, $\eta_{sp}$, through the relation $$\eta_{sp} = \frac{\eta_s}{\eta_0} - 1 = \frac{4DP}{IP - 2DP} \qquad (2)$$

where $\eta_s$ is the sample viscosity, and $\eta_0$ is the solvent viscosity. If the pump that drives the fluid through the system is not perfectly stable the system pressure, as well as the flow rate, fluctuate periodically. The assumption is that both sides of the DP transducer experience the same pressure pulses so that the differential nature of the transducers cancels out the pressure pulses. When the bridge is filled with pure solvent the DP signal should always equal zero.

By contrast, the IP transducer experiences no such cancellation. This is clear if one considers the Thévenin equivalent circuit associated with the bridge, as shown in FIG. 3. The bridge appears to be two series capillaries of impedance R (the left side of the bridge) in parallel with two series capillaries of impedance R (the right side of the bridge). The resulting circuit as seen by the IP transducer is simply a single capillary of impedance R. Therefore the IP transducer acts, for all intents and purposes, as a single capillary viscometer, with all of the problems of pump pulse pickup.

FIG. 4 presents data from a single capillary viscometer taken from a chromatographic elution of Bovine Serum Albumin (BSA) fractionated by a size exclusion column. The DP signal 401 is nearly free of pump pulses, whereas the IP signal 402 is not. The primary problem with the strong pump pulse reduction seen in FIG. 4 is that much of the benefit seen is not due to bridge cancellation. Instead pump pulses are suppressed because the DP sensor has a very slow time constant (~9 seconds) and is acting as a low pass filter, thus not offering the advantage of high resolution one expects from a high quality viscometer.

The time constant of the sensors in the system can be determined by performing a simple experiment. FIG. 5 shows the response of the instrument to a rapid change in the applied flow rate from 0.5 ml/min to 1.0 ml/min. The IP signal 501 jumps from 5.5 psi to 11 psi as expected, and equilibrates to the new valve with a time constant around 0.5 seconds. The DP signal 502, in contrast, has an initial perturbation and equilibrates to a new equilibrium value with a 9 second time constant.

The low pass filtering that occurs from slow sensors works well to eliminate pulses when the pressure oscillations are much faster than the characteristic time scale of the underlying peak. In the example shown in FIG. 6, a standard ViscoStar® H viscometer (Wyatt Technology Corporation, Santa Barbara, Calif.) equipped with a Validyne pressure transducer (Validyne Engineering, Northridge, Calif.) was used to measure a sample peak. The peak consisted of 100 µl of 2 mg/ml BSA injected directly into the viscometer. The flow rate was 0.6667 ml/min. The viscometer was configured with only the short delay column to reduce the sample runs to only a few minutes. The Validyne transducer has a time constant of around 9 seconds, and the pump pulses at this flow rate have a fundamental period of 1.85 seconds (frequency=0.54 Hz). The peak width is 30 seconds. Since the pump pulses are much faster than the sensor time constant it is undeniably effective at suppressing them.

Consider the difference in performance between using a slow sensor and a fast one. FIG. 7 shows data taken with the same system configured with DP86 transducers (Measurement Specialties, Fremont, Calif.). Measurements showed that these transducers have a time constant around 0.2 seconds in this system. As seen in FIG. 7, the pump pulses are very obvious. Therefore it can be deduced that the pulses were always present, but the Validyne transducers, because of their slow response, were suppressing them.

The problem with suppressing pump pulses by using a slow sensor or a low pass filter is that the sample peak is also distorted. To make this clear the data in FIG. 7 subjected to a 9 second moving average filter to simulate the effect of a slow transducer. The results are shown in FIG. 8. Contrast the raw signal 801 with the filtered data 802. As expected, the filtered data is nearly free from pump pulses, but the underlying peak is distorted. This will negatively impact the accuracy of any results derived from the distorted data. Moreover, recent trends in the chromatography industry have been working towards the improvement of peak resolution and shorten run times. New generations of uPLC chromatography systems have peaks that are only 10 seconds wide (or less). As peaks become narrower, the measured signals become progressively more distorted. Clearly using slow sensors to suppress pump pulses does not scale well.

A BRIEF DESCRIPTION OF THE DRAWINGS

Figure 1:
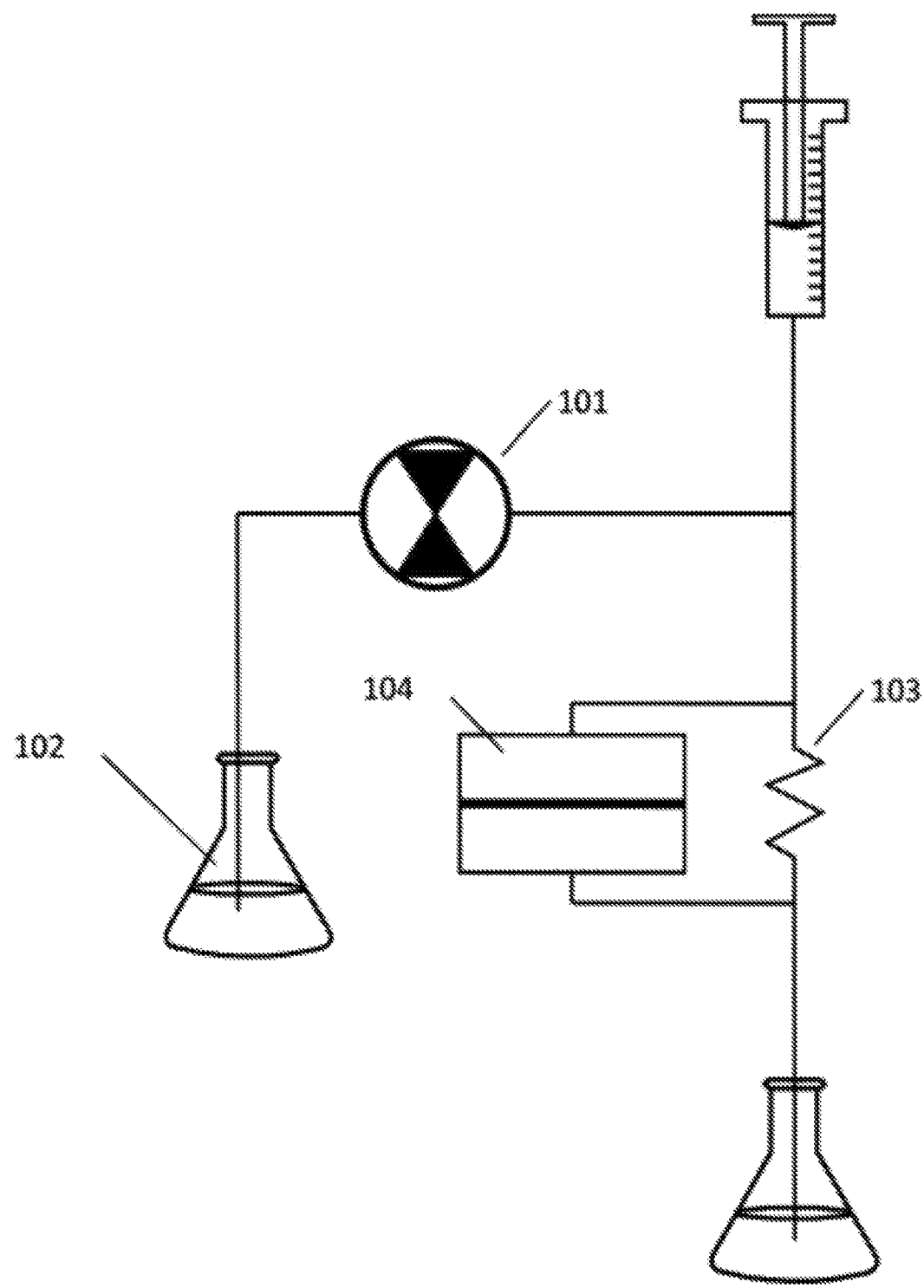
FIG. 1 Shows a single capillary viscometer. Sample is injected between the pump and the viscometer and the pressure drop across the capillary is measured with a differential pressure transducer.
Figure 2:
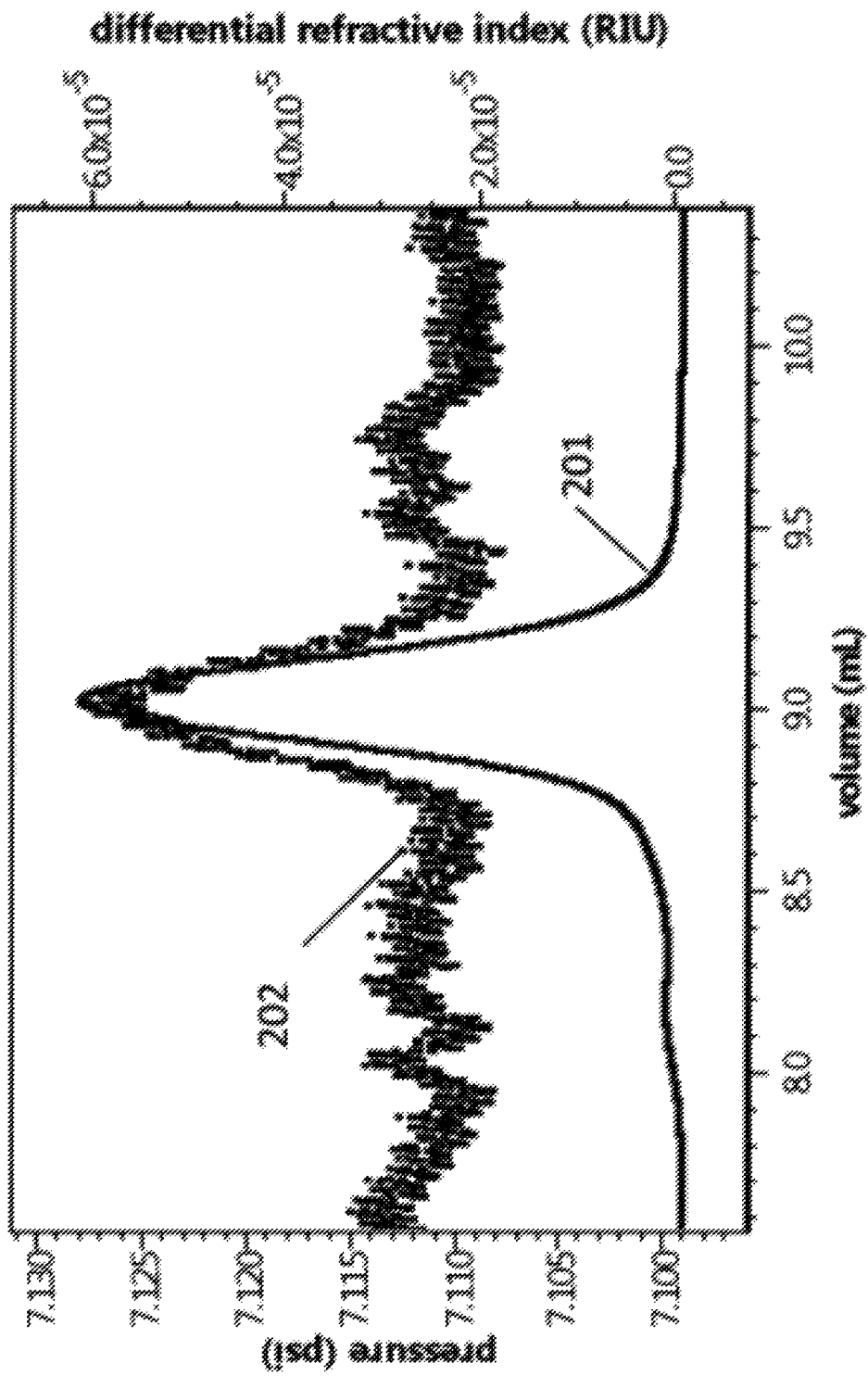
FIG. 2 is a comparison of differential refractive index and single capillary viscometer measurements. Pump pulses cause the high frequency oscillations in the pressure.
Figure 3:
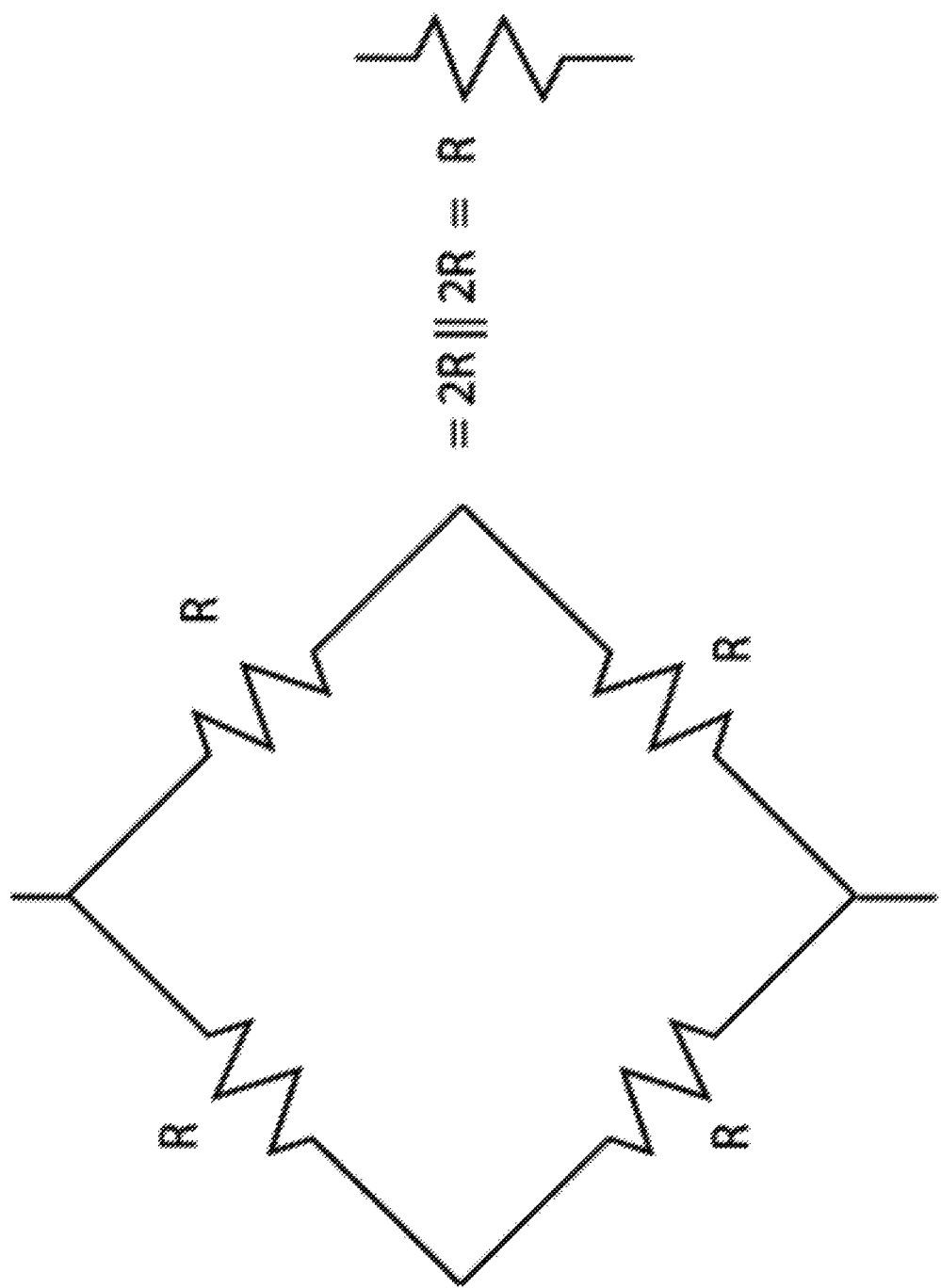
FIG. 3 shows a Thévenin equivalent circuit of the capillary bridge. The four impedances look to the IP transducer like a single capillary with an impedance of R.
Figure 4:
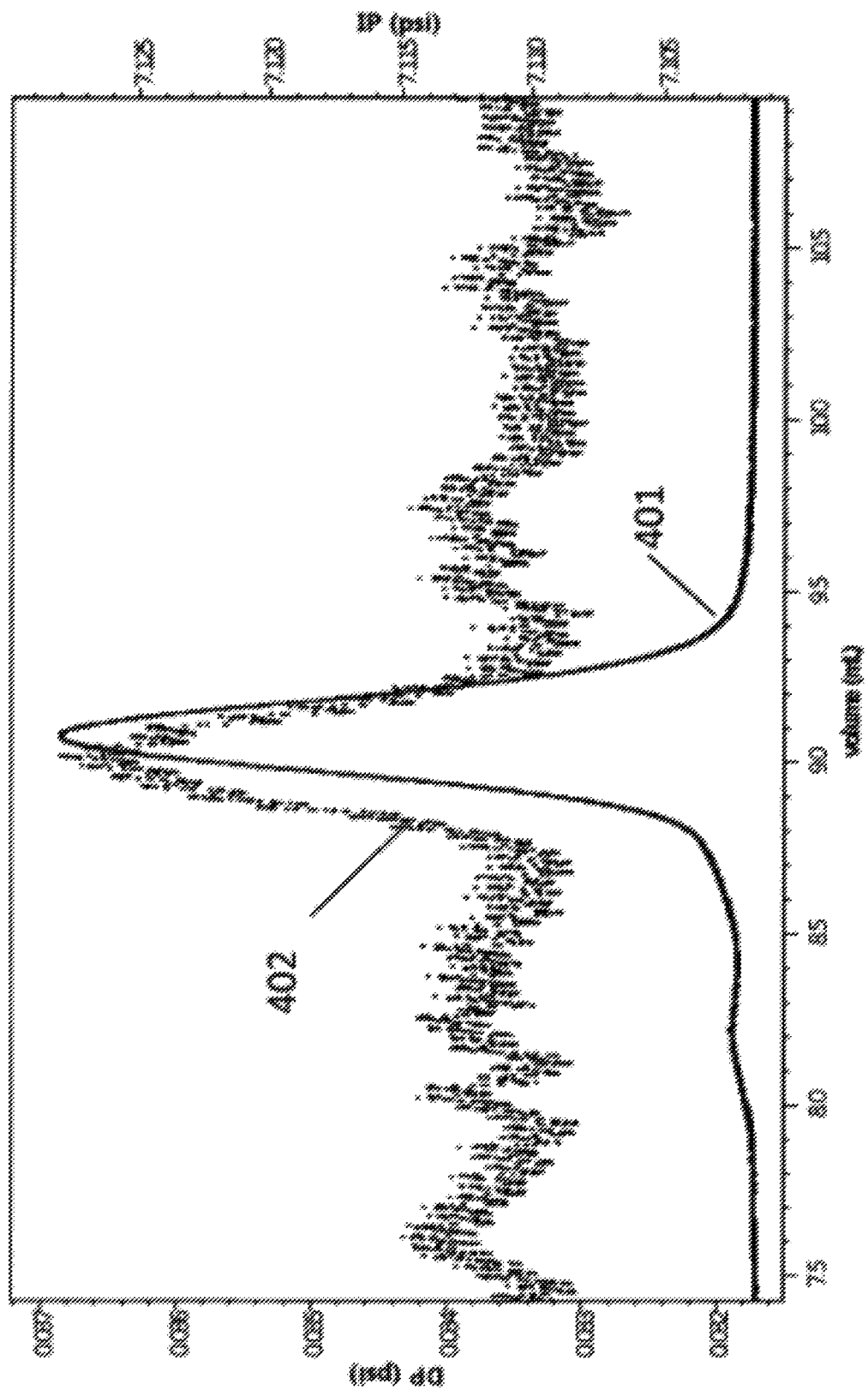
FIG. 4 shows data collected for IP and DP signals from BSA elution.
Figure 5:
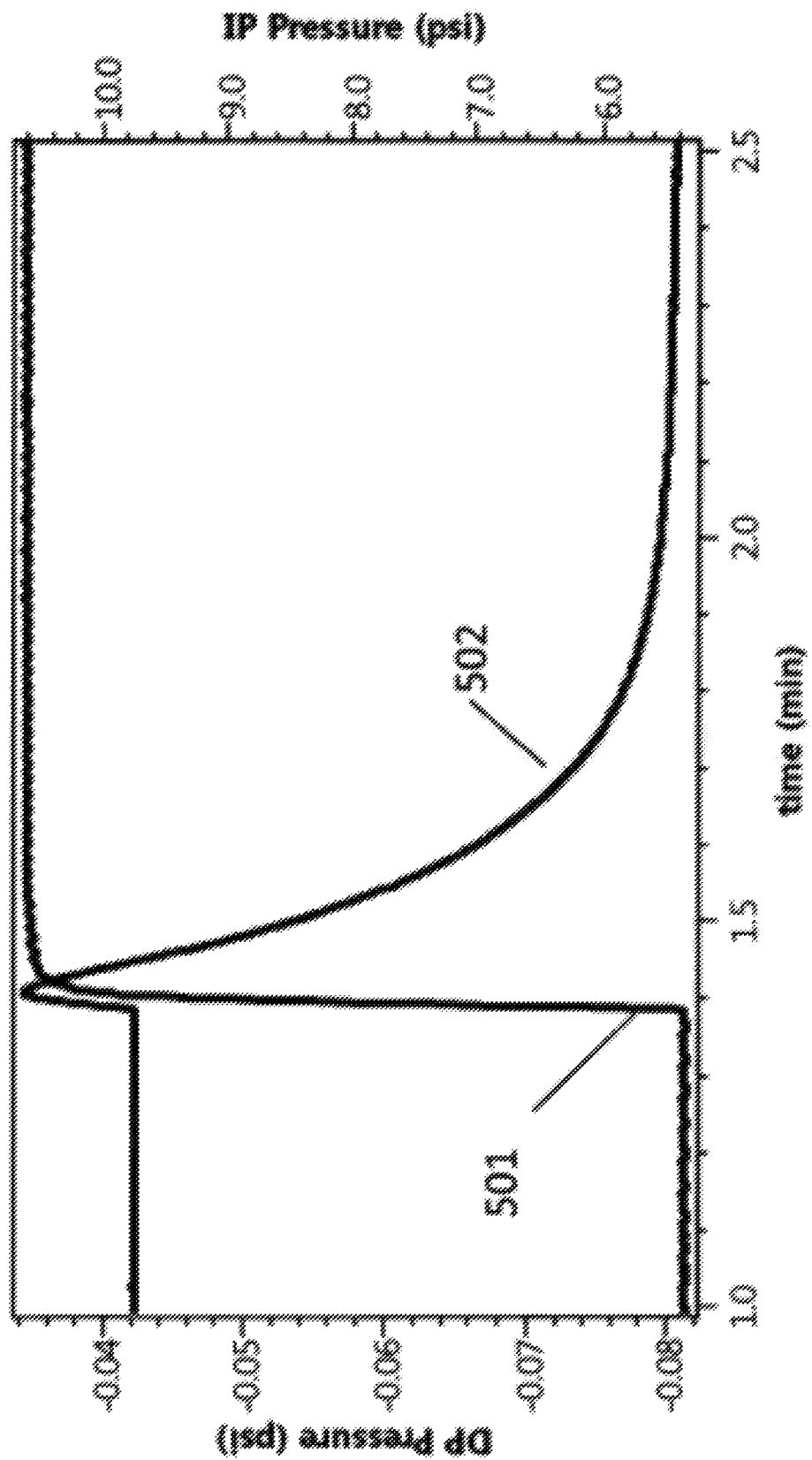
FIG. 5 shows the results of changing flow rate from 0.5 ml/min to 1.0 ml/min. The IP settles to a new value with a 0.5 second time constant, whereas the DP signal, after the initial perturbation, settles to a new value with a 9 second time constant.
Figure 6:
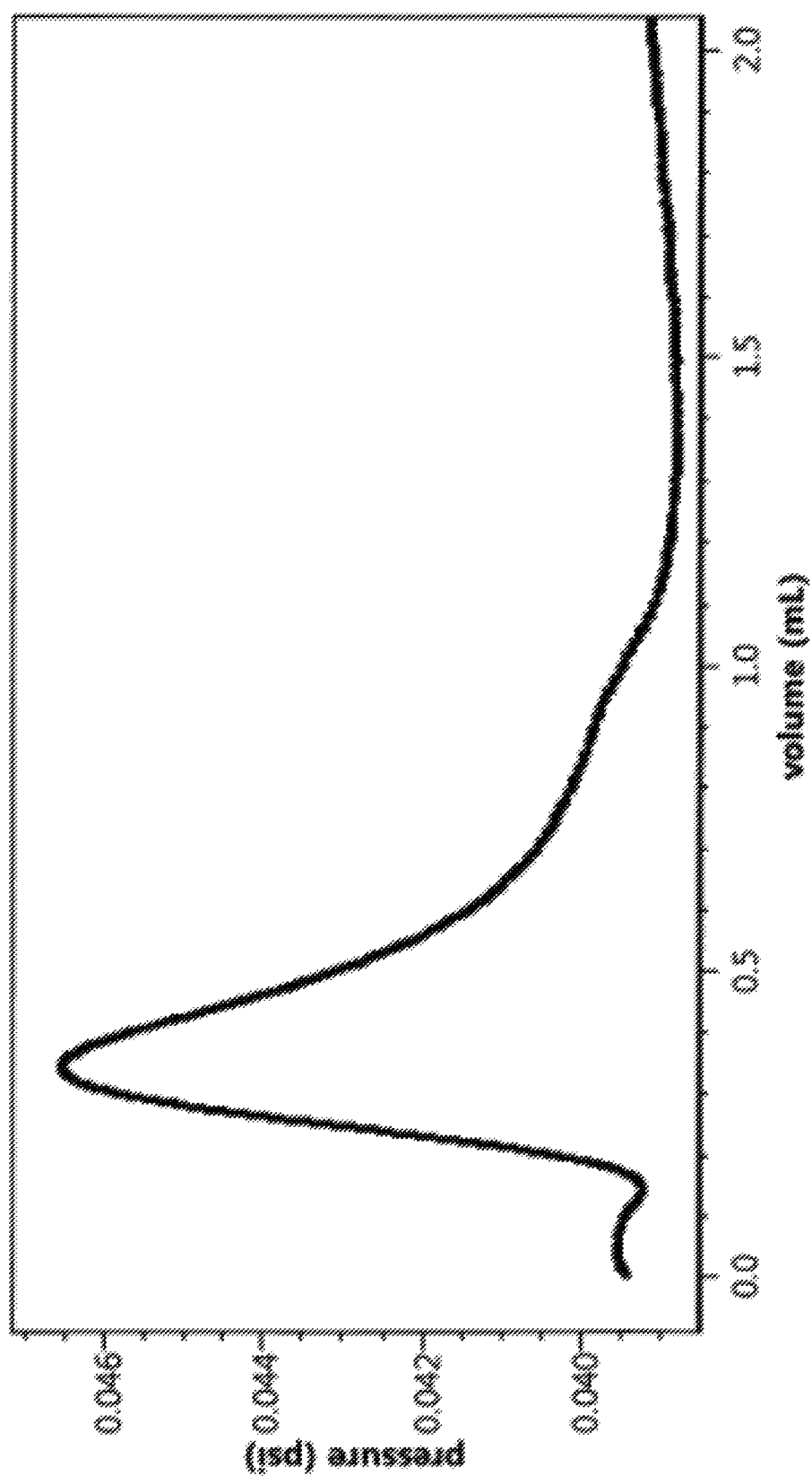
FIG. 6 is a simulated sample peak measured by a standard viscometer equipped with a short delay column. Pickup of pump pulses is not evident.
Figure 7:
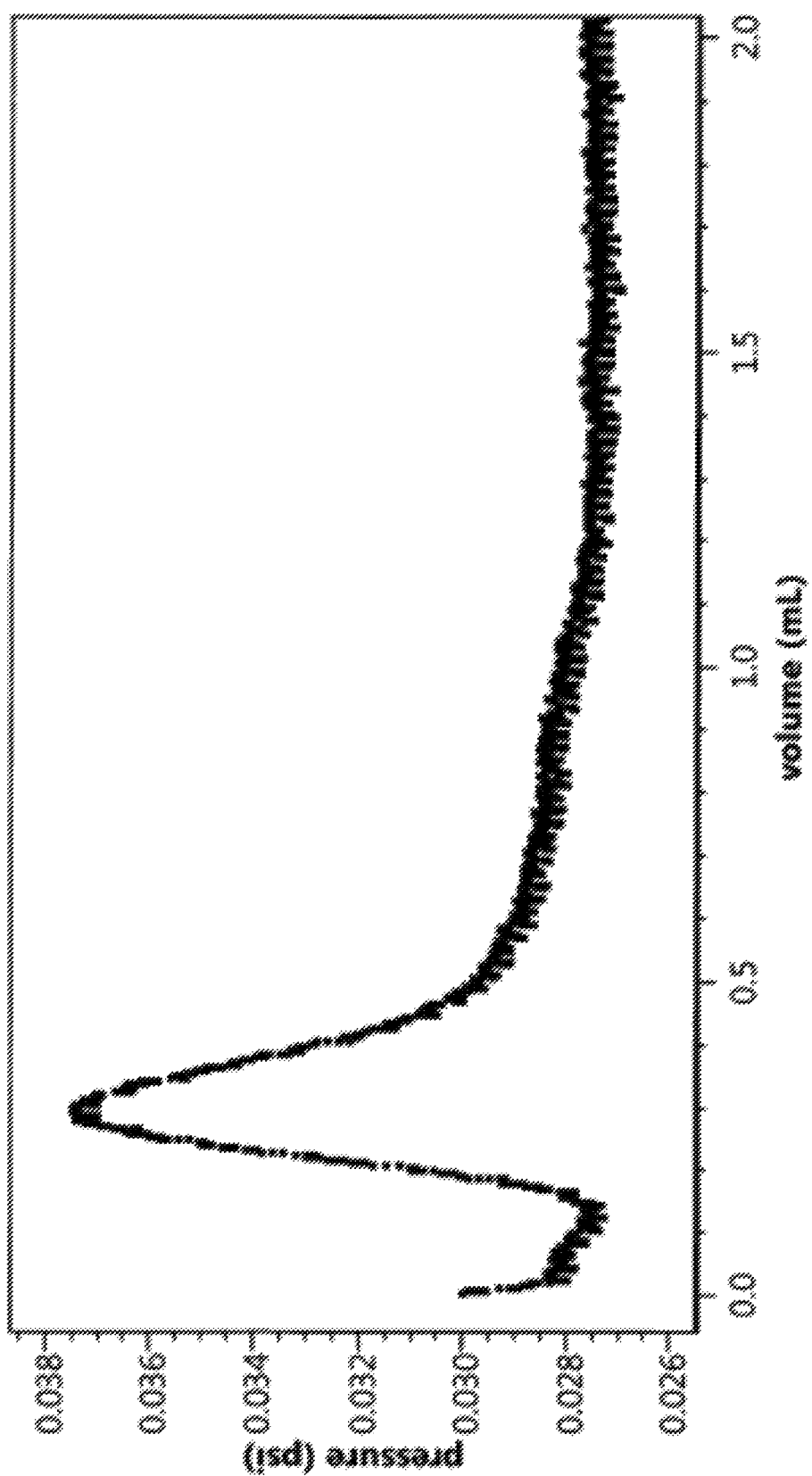
FIG. 7 shows data from the same configuration as that used to generate the data from FIG. 6, but with DP86 transducers that have a time constant of approximately 0.2 seconds. Pump pulses are very obvious.
Figure 8:
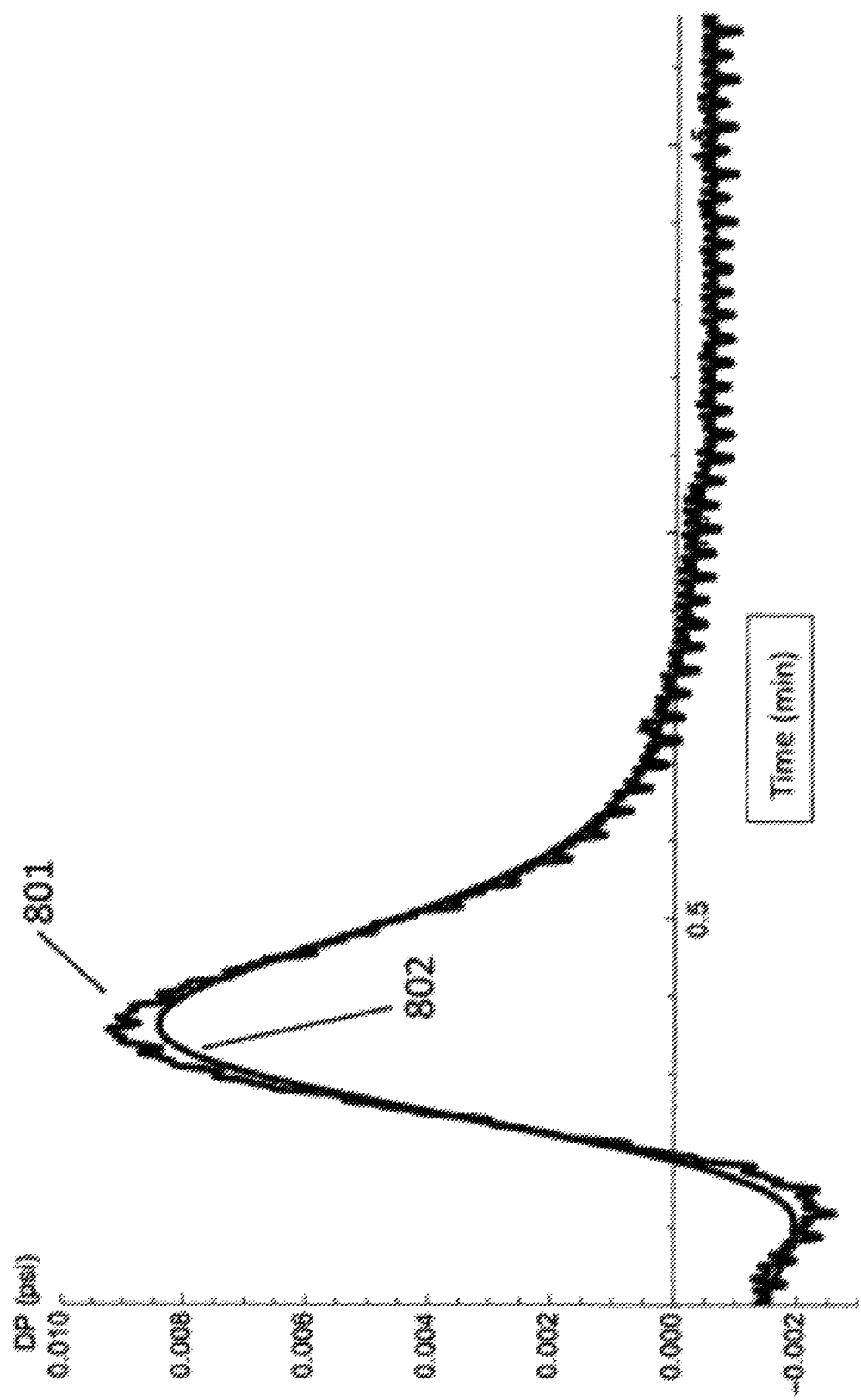
FIG. 8 shows the effect of a low pass filter at removing pump pulses. Low pass filtering strongly suppresses the pulses but at the expense of distorted peaks.
Figure 9:
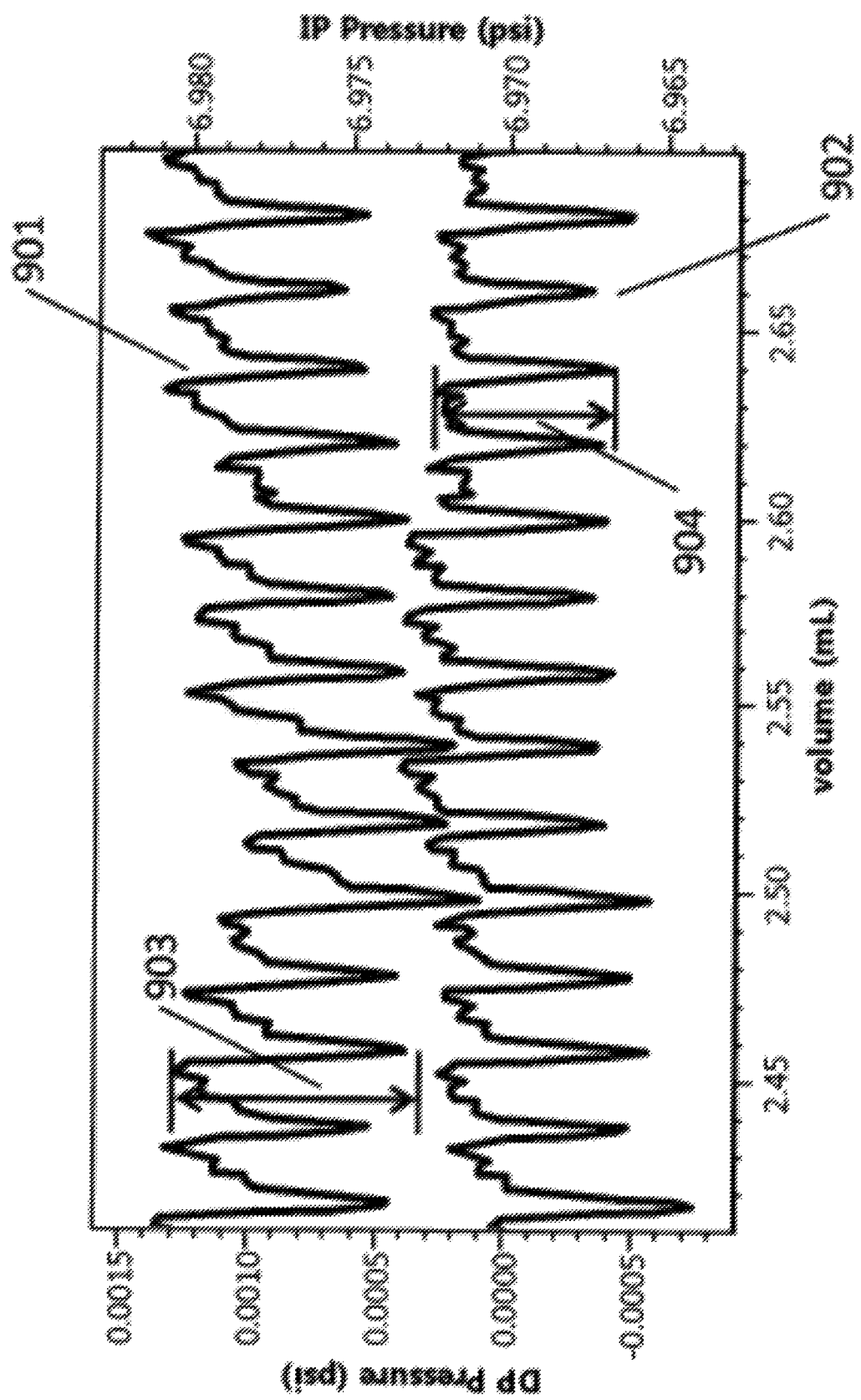

FIG. 9 explains, in graphical terms, the definition of IPA and DPA.

Figure 10:
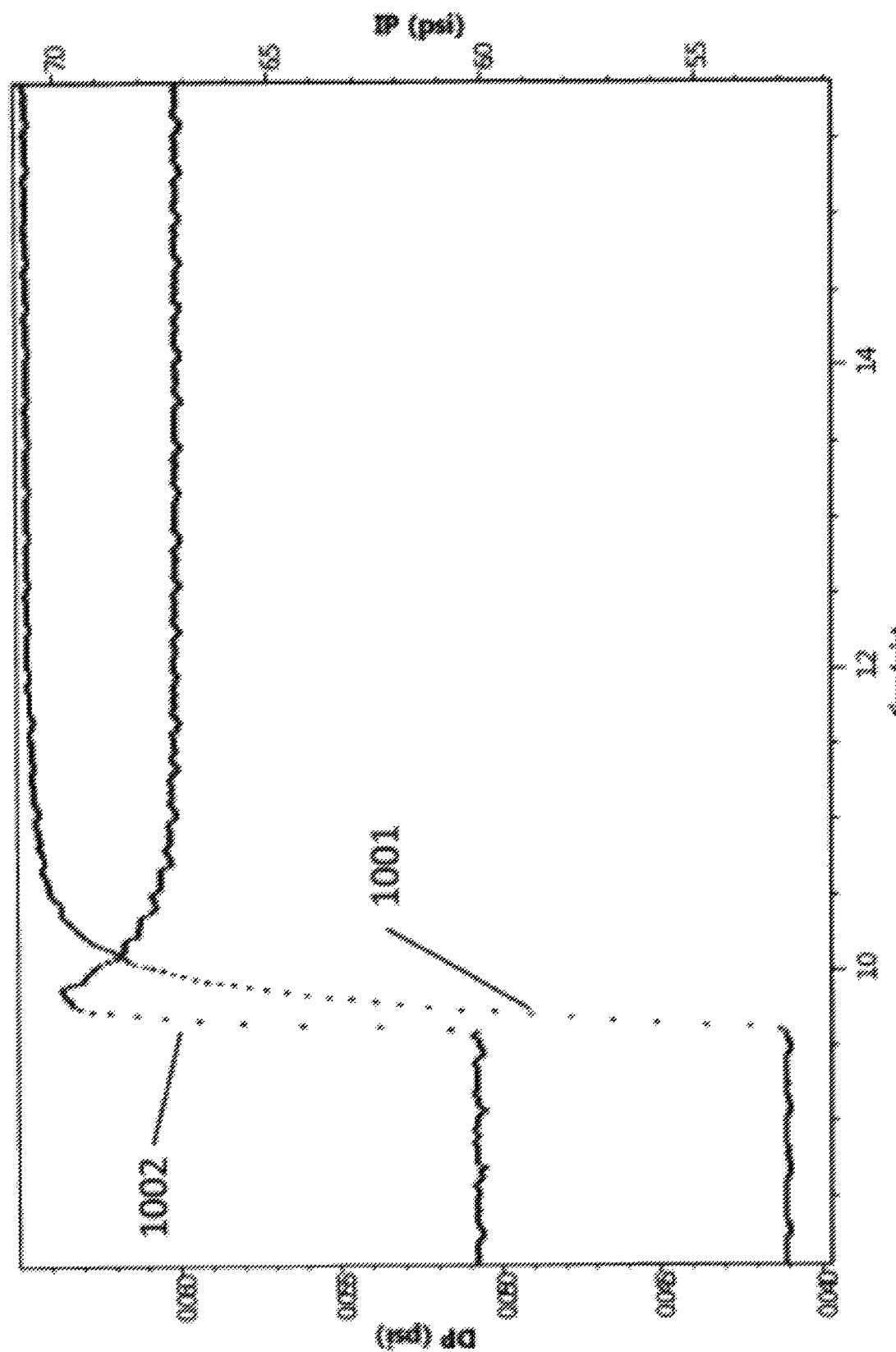

FIG. 10 shows an experiment in which the flow rate was changed abruptly from 0.5 ml/min to 0.6667 ml/min. The IP pressure is on the right axis. The DP pressure is on the left axis. IP changes smoothly between the 5.4 psi and 7.2 psi. The DP sensor overshoots its final pressure.

Figure 11:
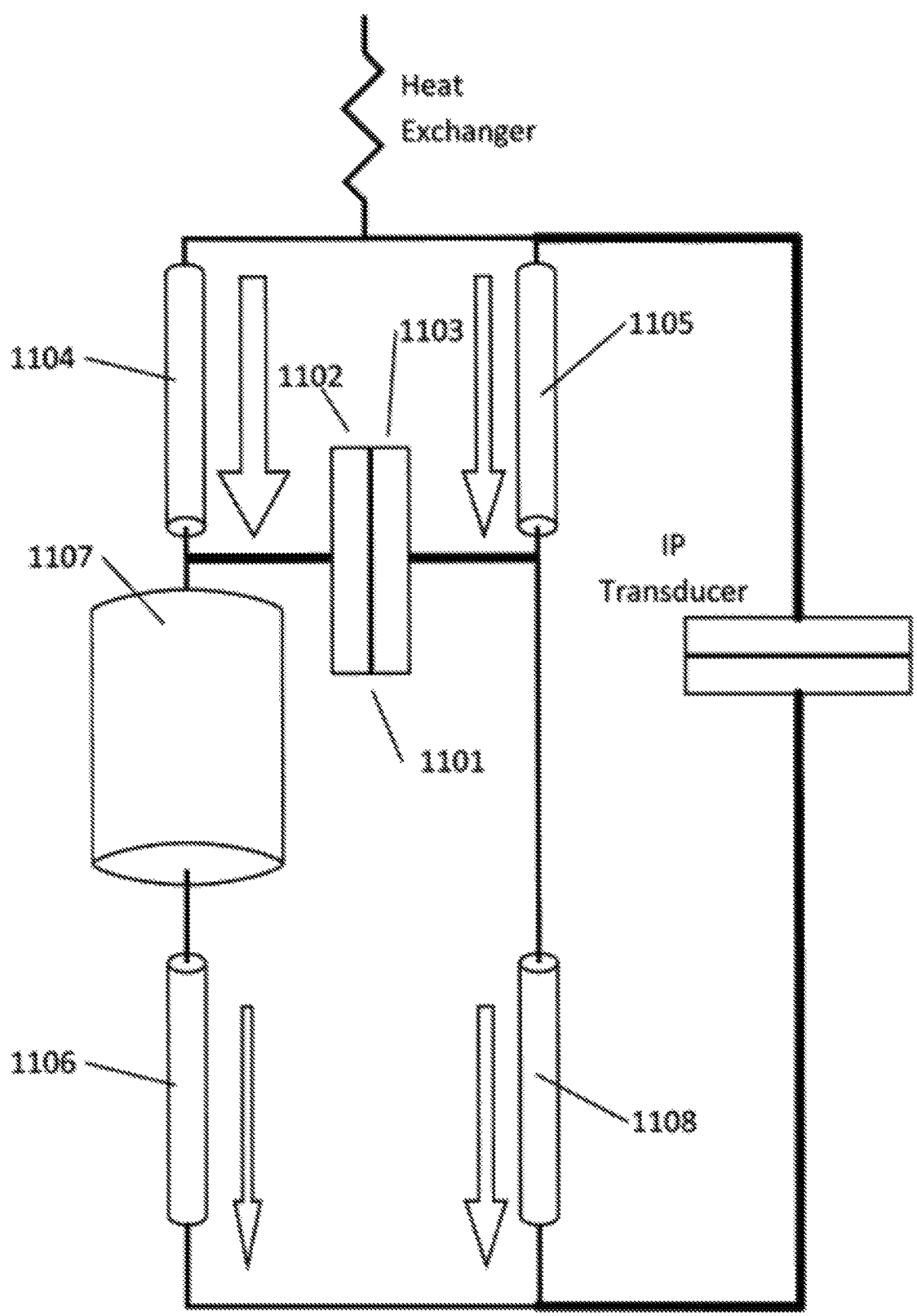

FIG. 11 illustrates the flow rate changes during an overshoot event. The arrows denote the relative magnitude of the flow in various parts of the bridge.

Figure 12:
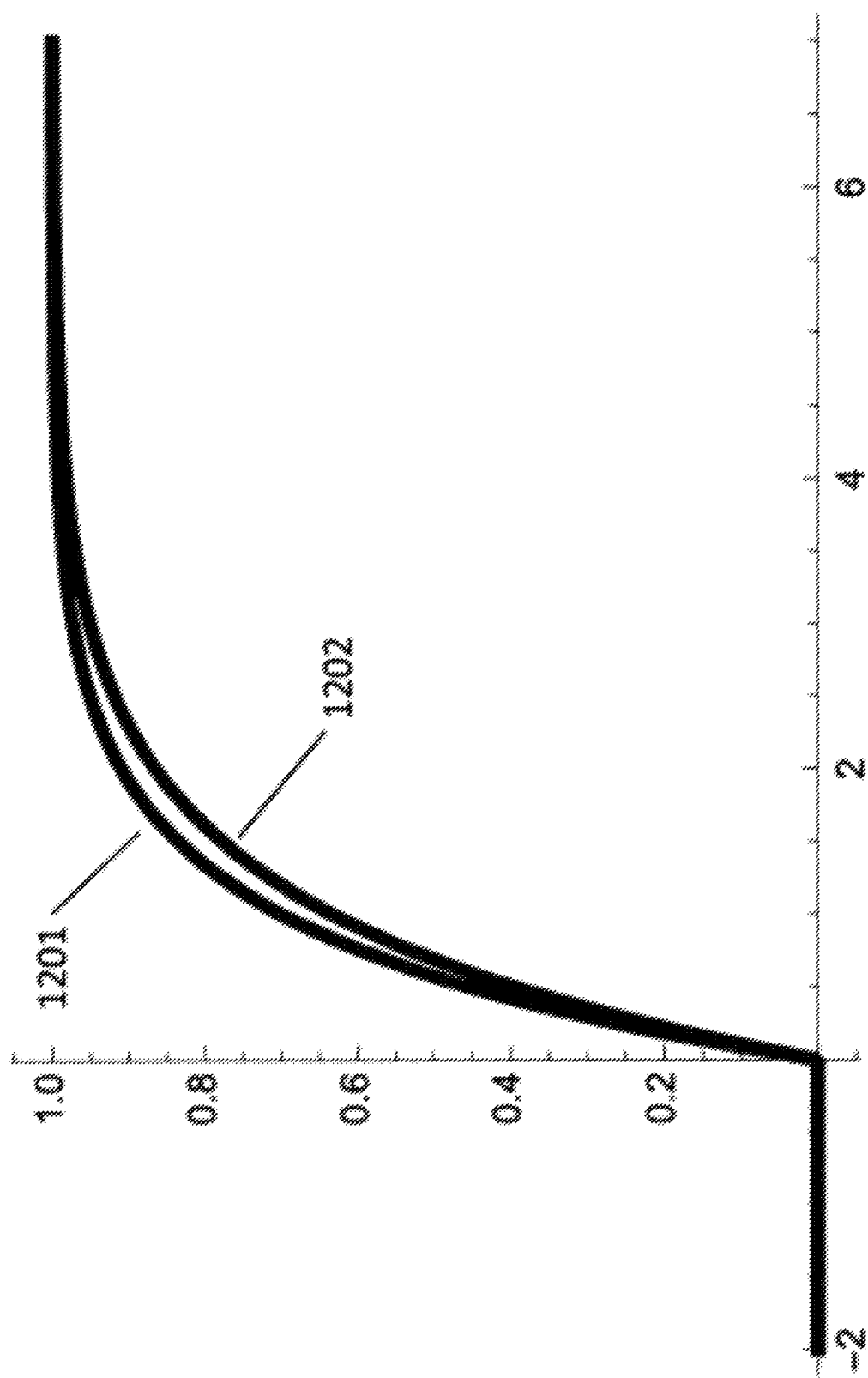

FIG. 12 an illustration of the absolute pressure on both sides of the DP transducer during a flow rate step. Both the right and left sides of the bridge increase at different rates. Note this illustration assumes that the bridge is perfectly balanced so that $DP_+$ and $DP_-$ reach the same final value. For an imperfectly balanced bridge, the overall results are the same but with a small offset in the final values.

Figure 13:
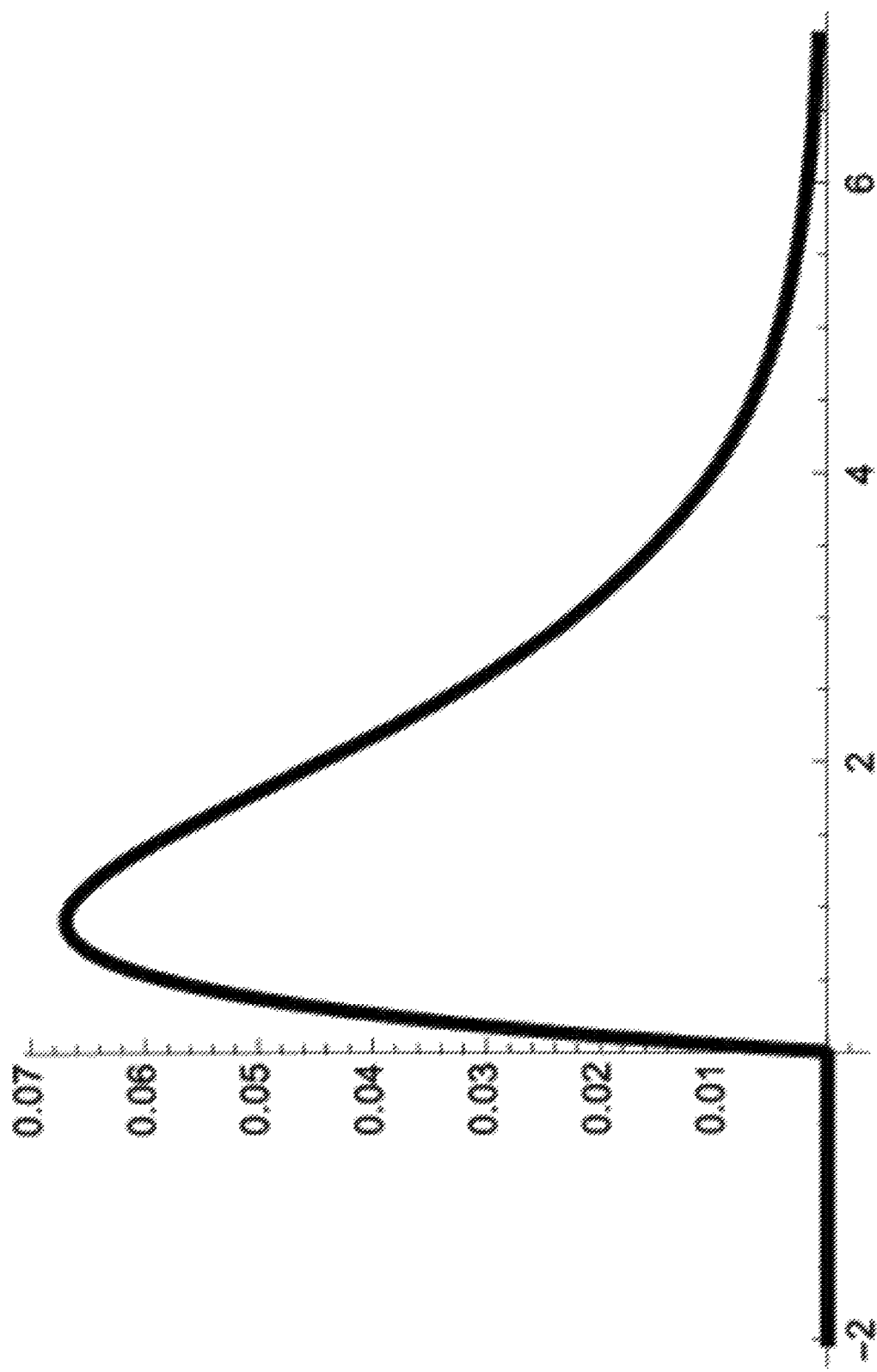

FIG. 13 shows the difference of two signals of the example shown in FIG. 12.

Figure 14:
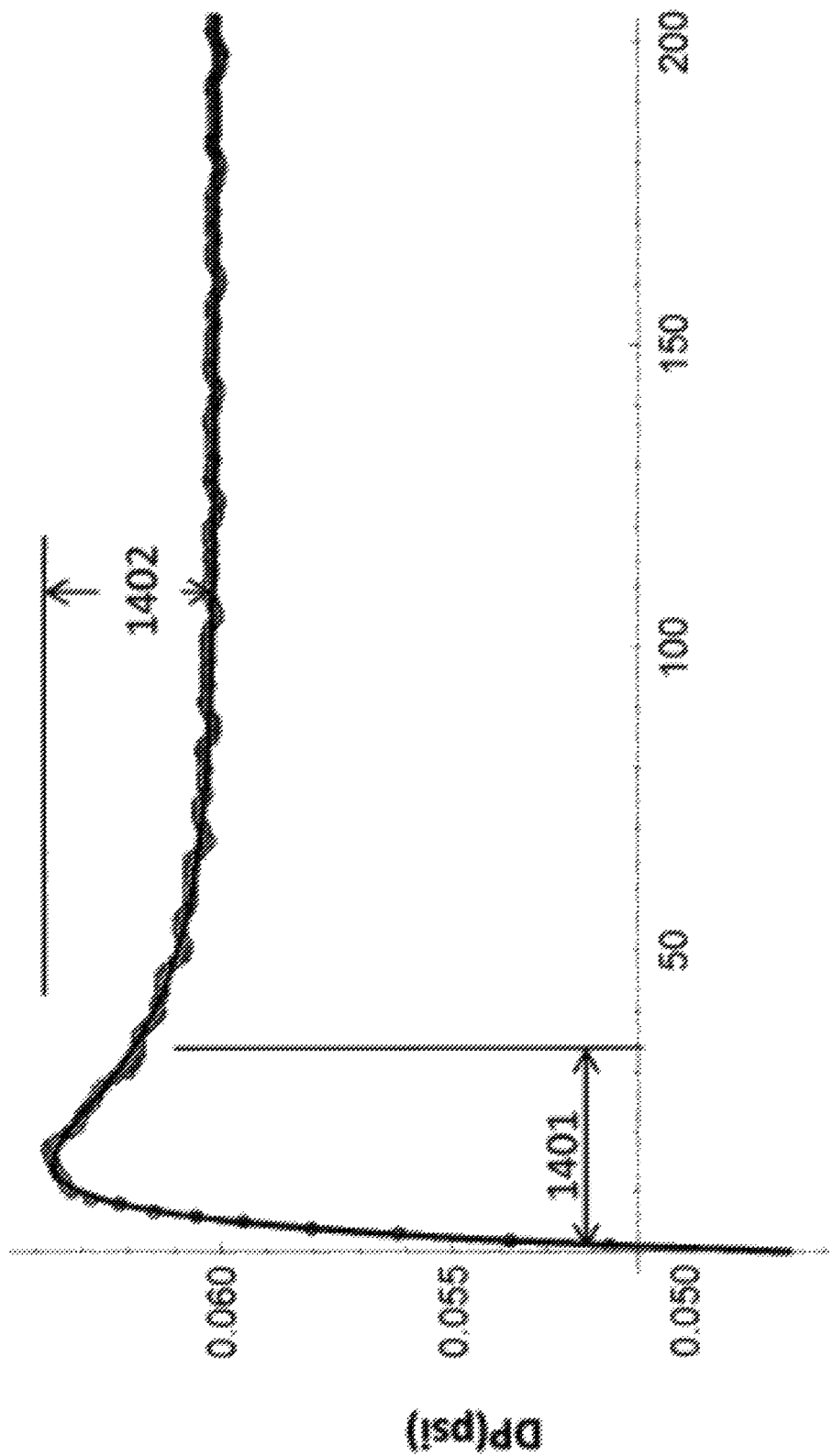

FIG. 14 is the actual overshoot data from the experiment of FIG. 10 fit to the difference of exponential model above. The points are the data and the overlaying line is the fit.

Figure 15:
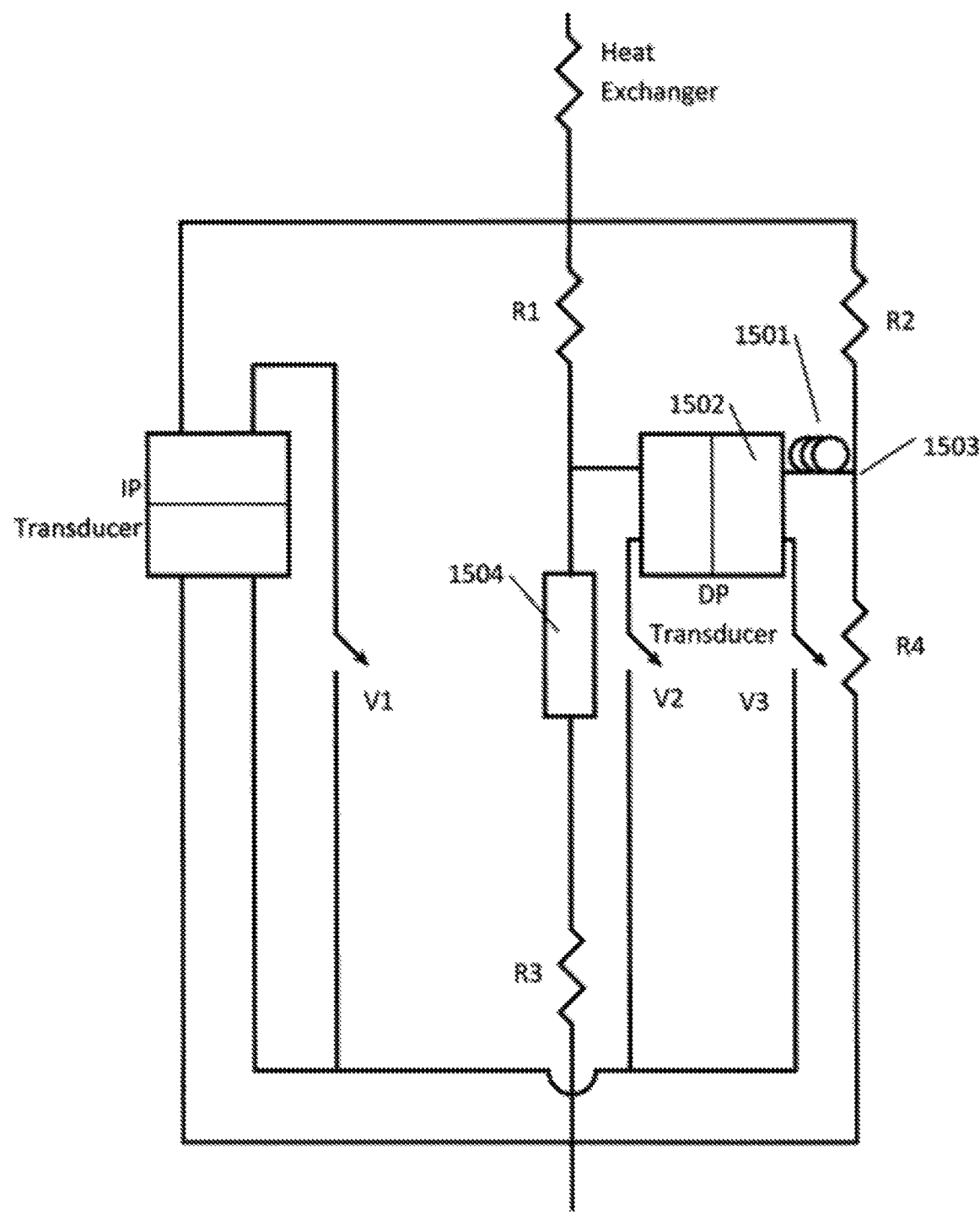

FIG. 15 shows a novel modification of the 4 capillary bridge design to include Pulse Compensation (PC).

Figure 16:
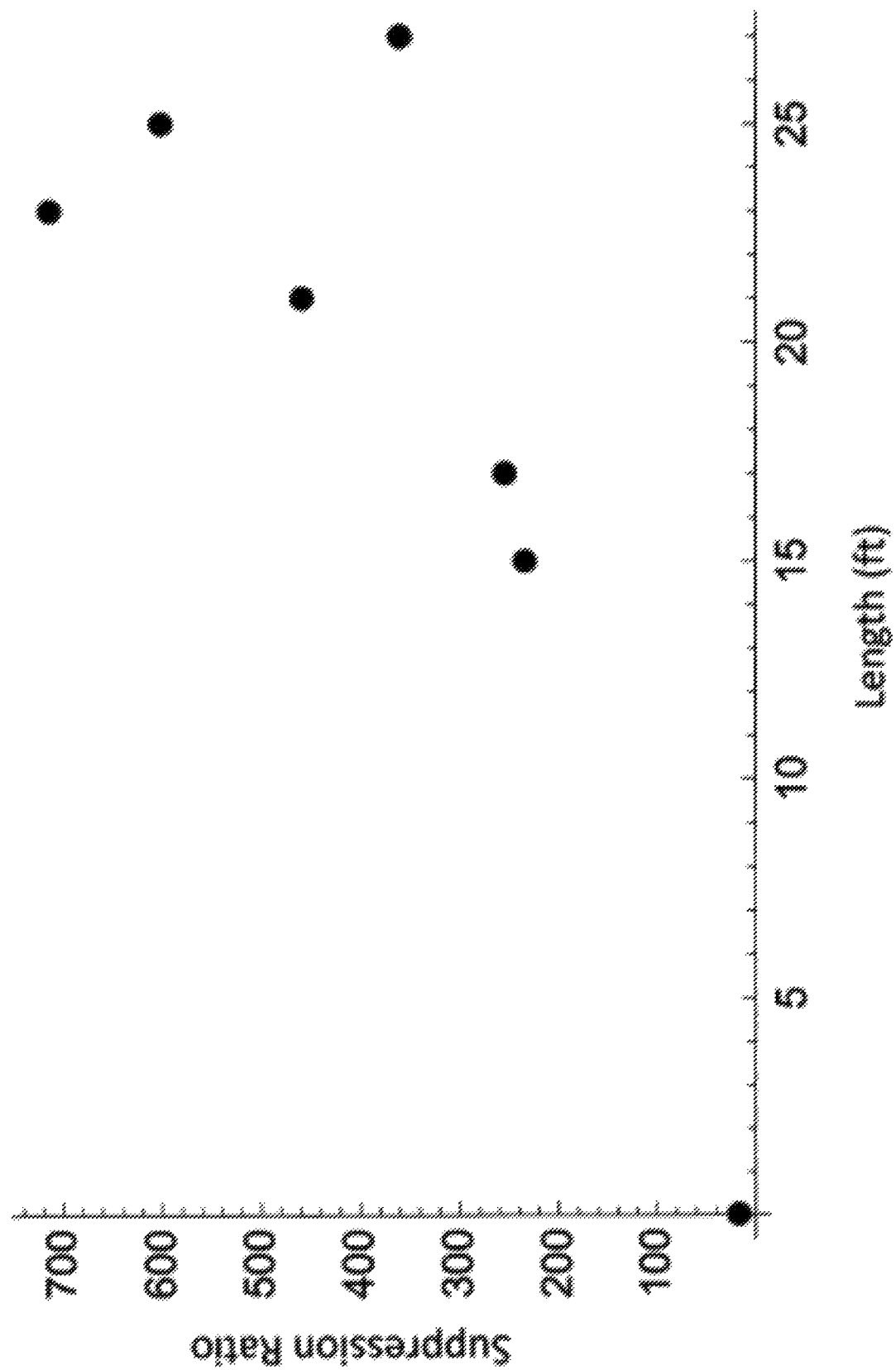

FIG. 16 shows the suppression ratio as a function of the PC tubing length for 0.050" ID stainless steel tubing.

Figure 17:
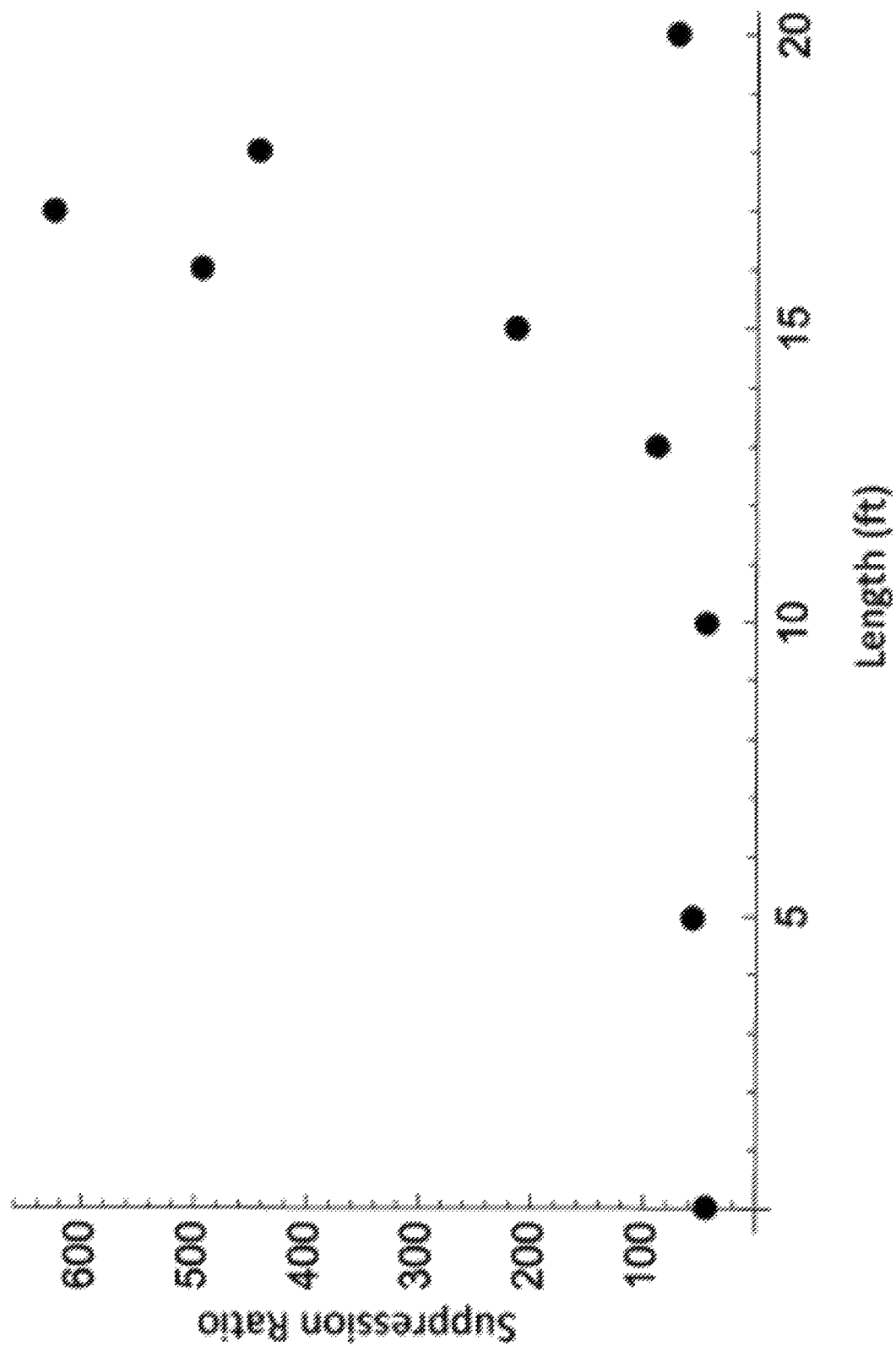

FIG. 17 shows the suppression ratio as a function of length of the PC for 0.030" ID PEEK tubing.

DETAILED DESCRIPTION OF THE INVENTION

A novel modification to conventional viscometric measurement systems can correct the time constant mismatch that is inherent to conventional capillary bridge designs. An additional volume is added to the system which compensates for the pump pulses which traditionally limit the possible sensitivity of measurements.

Rather than relying on slow transducers or low pass filtering to suppress pump pulses, it is much better to understand what limits the bridge's ability to prevent them in the first place. In order to quantify the effectiveness of the pump pulse cancellation the following metric will be used. The amplitude suppression ratio is defined as:

$$SR_a = IPA/DPA \tag{3}$$

where IPA is the amplitude of the pump pulses as measured by the IP transducer, and DPA is the amplitude of pulses measured by DP transducer.

FIG. 9 shows the IP 901 signal plotted on the right axis and the DP signal 902 plotted on the left axis. The solvent was PBS flowing at 0.6667 ml/min pumped by a Shimadzu LC-20AD solvent delivery module (Shimadzu Corporation, Kyoto, Japan). The pump was stabilized by flowing the solvent through 10 ft of 0.005" ID polyether ether ketone (PEEK) tubing before it flowed into the viscometer. This creates about 1000 psi back-pressure on the pump. The combination of back-pressure and expansion of the PEEK tubing acts as a simple pulse dampener.

Defining the suppression ratio in this way gives a quantitative measure of how effectively the bridge suppresses pump pulses. If the bridge were working perfectly, the suppression ratio would be infinite. In the example shown in FIG. 9, IPA=6E-3 psi 903 and DPA=8E-4 psi 904, so the suppression ratio is 7.5, meaning that pump pulses as seen by the DP transducer are 7.5 smaller than those seen by the IP transducer.

Although the amplitude suppression ratio measures the peak-to-peak excursions, is worth noting that the suppression is a function of frequency. The frequency dependent suppression ratio is defined as $$SR(\omega) = |IP(\omega)/DP(\omega)| \tag{4}$$

where $IP(\omega)$ and $DP(\omega)$ are the Fourier Transforms of $IP(t)$ and $DP(t)$ respectively. For the rest of the discussion only the suppression ratio $SR(\omega_0)$, where a is the fundamental pump frequency will be considered. The advantage to using this definition is that it is less sensitive to the intrinsic noise of the detectors and the measurement system. It better characterizes the performance of the underlying bridge's ability to cancel the pump pulses.

For the Shimadzu pump used in these experiments, running at 0.6667 ml/min, the fundamental frequency is o=0.54 Hz. For the data in FIG. 9, SR(0.54 Hz)=17, which means that the bridge suppresses pump pulses by this amount at the fundamental frequency of the pump. The reason that the suppression ratio at the pump frequency is higher than the amplitude suppression ratio is that higher frequency harmonics are not suppressed as strongly as the fundamental. For the rest of the discussion all data was taken at 0.667 ml/min and SR will refer to $SR(\omega_0)$.

One key feature of the bridge design is that the delay columns are designed to have a large internal volume, but a vanishingly small flow impedance. This is accomplished by filling columns with large diameter beads. Because the interstices are large, the flow impedance is very low. The ViscoStar viscometer (Wyatt Technology Corporation, Santa Barbara, Calif.), for example, uses 0.4 mm diameter ZrSiO2 beads. The open space accessible to the sample fluid is 8.1 ml. This can be compared to the individual capillaries, which are 0.25 mm ID and 660 mm long with an internal volume of 33 µl. The pressure drop across the delay volume is less than 1% of the pressure drop across the measurement capillaries. The bridge is balanced with the columns installed so that the pressure drop across the DP transducer is adjusted to nearly zero when there is pure solvent flowing. The pressure drop across the column has a negligible effect on the calculation of the specific viscosity, although as will be argued below the delay volume plays an unexpected role in limiting the ability of the bridge to cancel pump pulses.

If the column is ignored in the analysis, the bridge is essentially symmetric. Both sides of the DP transducer should see pump pulses equally. Since DP is a differential sensor, any common mode signal, such as the pump pulses, will cancel and the suppression ratio should diverge. The actual suppression ratio is around 17. So the question must be asked, why are pump pulses not better cancelled?

Of course the presence of the delay column in the left side of the bridge breaks the symmetry. One of the main goals of this disclosure is to understand how this affects the data and how it can be corrected. One could imagine several possible mechanisms whereby breaking the left-right symmetry of the bridge will spoil the pump pulse cancellation. Consider the following observations that help shed light on this question.

First is that the pump pulses are positively correlated with the signal seen by the P transducer. When the P signal is high, the DP signal is also high. However if the bridge were truly symmetric, there would be nothing to distinguish the DP+ side from the DP− side. One would expect any given realization of the bridge would sometimes be positively correlated and sometimes negatively correlated, but this is not the case; they are always positively correlated. When the DP transducer is reversed (with the + and − sides ports switched) the effect reverses. This implies that the side that is opposite of the delay column is correlated with the IP. When transducers from different vendors are used, the effect is persistent showing that the effect is not somehow being generated inside the transducer.

The next observation is that if one puts in a smaller delay column, the suppression ratio increases. This is not surprising since by making the delay volume smaller, the system becomes more symmetric. In the limit where the delay volume is eliminated, the suppression ratio rises by over an order of magnitude. However, this is of academic interest since delay volume is required for the system to be used to measure specific viscosity.

The final observation is to consider what happens when the flow rate is changed abruptly. FIG. 10 shows the change in the baseline when the flow rate is abruptly changed from 0.5 ml/min to 0.6667 ml/min. The IP transducer signal 1001 increases smoothly from around 5.4 psi to 7.2 psi. The time scale for this change is presumably from a combination of how quickly the pump was able to change the flow rate, and the time constant of the transducer. More interesting is what happens to the DP signal 1002. The baseline changes from 0.051 psi to 0.060 psi. If the four bridge capillaries were perfectly matched, the baseline would be zero for all flow rates. If this system is slightly out of balance, as is the case here, the change in the baseline is proportional to the applied flow rate. However the salient point is that the signal overshoots the new baseline. Consider the implications that this has for flow in the bridge.

FIG. 11 presents a simple model of the pressure change on either side of the DP transducer 1101. As the flow rate is stepped the absolute pressure on both sides of the DP transducer 1101 must increase. We will denote the pressure on the negative side as $DP_-(t)$ 1102 and the pressure on the positive side as DP(t) 1103. During the overshoot event we know that $DP(t)=DP_+(t)-DP_-(t)$ is larger than its final equilibrium value. Therefore the pressure on the positive 1103 side of the transducer is higher than on the negative side 1102. The implication therefore is that the pressure difference, and therefore the flow rate, on the upper left capillary 1104 is higher than on the upper right capillary 1105. This is denoted in FIG. 11 by the thickness of the lined arrows. Similarly the flow through the lower left capillary 1106 after the delay volume 1107 is lower than through the lower right capillary 1108. Schematically the pressure of the two sides of the bridge are shown in FIG. 12 by the traces of $DP_+(t)$ 1201 and $DP_-(t)$ 1202. The difference between the two signals shown in FIG. 12 has an overshoot that is shown in FIG. 13.

The data shown in FIG. 10 can be fit a model including an offset to represent the imperfect bridge balance. The result is shown in FIG. 14. The time scale of the overshoot 1401 is approximately 3 seconds and the amplitude 1402 is 0.004 psi. The measured pressure data are overlaid with the fit to the model $$DP(t)=a+b\ \exp(-c_1 t)-d\ \exp(-c_2 t) \quad (5)$$

where a, b, $c_1$, $c_2$, and d are adjustable parameters.

This model assumes that the flow rate in the upper left capillary is higher than that in the lower left capillary. Since the two capillaries are in series, this appears to be a contradiction. However the fit to the model suggests that this is true.

It is not a contradiction if we assume that during the overshoot event, fluid accumulates in the delay volume. There are two possible scenarios whereby this could happen. The first scenario is if the volume inside delay column is changing in response to the increased pressure. The second scenario is if the fluid is compressing in response to the changing pressure. In order to evaluate the relative magnitude of these two hypotheses, we can estimate how much fluid is accumulated by looking at the size of the overshoot shown in FIG. 14. The volume of the accumulated fluid is roughly $\Delta v = Qt\Delta p/p$ where Q is the volume flow rate through the capillary (~0.25 ml/min), t is time (~3 sec), $\Delta p$ is the amplitude of the overshoot (~0.004 psi) and p is the local pressure (~2.5 psi). Putting all of this together gives a rough estimate of Δv≈20 nL.

The change in volume of the delay columns can be determined by the well-known formula for the expansion of a pressurized cylinder $$\Delta v = \frac{\Delta p d}{4TE}(5-4v)V \quad (6)$$

where Δv is the change in volume, Δp is the change in pressure, d is the inner diameter of the tube, T is the wall thickness, E is Young's Modulus, and v is Poisson's ratio. When evaluated for the tubing in the delay volume the result is Δv=6 nL which is smaller than the expected effect.

Similarly one can evaluate how much the solvent compresses. Water has a very low compressibility of $4.6 \times 10^{-10}$ $Pa^{-1}$. The delay column has an internal volume of approximately 8.1 mL and the pressure change is around 0.85 psi (=6 kPa), so that the resulting change in volume is approximately ΔV~20 nL, which is consistent with the expected size of the effect. The conclusion is that the overshoot is due to a mismatch in the time constant for pressure changes to equilibrate on the two sides of the DP transducer. The source of this time constant mismatch is a combination of solvent compressibility and tubing expansion.

Fortunately this time constant mismatch can be corrected with a modification of the capillary bridge design. Consider the bridge shown in FIG. 15, which represents an embodiment of the invention within a capillary bridge viscometer system with the novel addition of an additional pulse compensation volume 1501. This is a large volume of fluid that is intended to balance the compressibility of the fluid in the delay columns.

The pulse compensation (PC) volume 1501 cannot be put in series with the measurement capillaries or it would affect the viscosity measurement. By putting it between DP+ 1502 and the T-union 1503 connecting R2 and R4, none of the sample passes through it. It simply transmits the pressure to the sensor. One can adjust the volume in PC until it matches that from the delay columns 1504. When the valves V2 and V3 are actuated (DP Purge), the PC volume 1501 is flushed along with the interior of the DP transducer. One does not have to put the PC in series with the transducer; one could equally well put it on a separate T connection between R2 and R4, but in this location it would require an additional valve to flush it and eliminate bubbles and trapped fluid. The PC could take the form of a delay column like that in the left arm but since the sample never flows through PC a long length of capillary works as well. Indeed using a long length of capillary tubing is less expensive and more compact.

FIG. 16 shows the effect of varying the length of 0.050" ID capillary tubing used as the PC volume. As the length of the capillary increases, the suppression ratio grows until it reaches a maximum around 23 ft, at which point the volume of the PC is 8.4 mL. The delay columns on the lower left side of the bridge have an aggregate interior volume of 22.5 mL, but they are filled with a packed powder of spherical beads. The space accessible by the fluid depends on how tightly the beads are packed, but an optimal random close pack of spheres fills 64%, leaving 36% open to the fluid. Therefore the total volume in the delay columns is approximately 22.5 mL*0.36=8.1 mL. This represents a lower bound. If the beads are not perfectly packed, the actual volume may be slightly higher. Therefore the peak suppression ratio occurs when the PC volume matches the open space in the delay volumes. The peak suppression ratio is nearly two orders of magnitude higher than the standard bridge, and the parasitic noise from pump pulses is essentially eliminated. This is a primary goal of this invention. The improved design increases the system sensitivity while simultaneously allowing for the use of less expensive pumps.

The data presented in the previous section argue strongly that the pulse compensation tubing balances the compressibility of the solvent, and to a lesser extent the volume expansion of the delay volume tubing. Another way to test this hypothesis is by switching to a solvent that has a different compressibility to see if the system is remains balanced. If, as the argument above suggests, the primary effect is due to solvent compressibility and not expansion of the delay volume and capillaries, the system will remain balanced when the solvent is changed. To that end, the solvent was switched from water to toluene, and the suppression ratio was re-measured. The data was taken at the same flow rate (0.6667 ml/min) but a different pump system was used. The fundamental pulse frequency, which is set by the pump, was 0.384 Hz. Even so, at the pump frequency that suppression ratio was 648, which is close to that value measured in water. This supports the idea that the PC volume is compensating for the solvent compressibility, and that the expansion of the tubing plays a minor role. This also means that the system does not need to be retuned for each solvent.

To investigate whether tubing expansion ever plays a role in the pickup of pump pulses a series of experiments were performed using PEEK capillary tubing for the PC volume. Since PEEK has a much lower Young's modulus than stainless steel, it expands much more than equivalent stainless steel tubing. One expects that expansion of the tubing will play a role in addition to that from the solvent compressibility. The prediction therefore is that a smaller volume in the PC would be required to balance the system. FIG. 17 shows the result of measuring the suppression ratio as a function of tubing length in aqueous solutions. The peak in the curve corresponds to a 17 ft length of 0.030" ID PEEK tubing. The interior volume is 2.4 mL compared to 8.4 mL that was required when using stainless steel capillary. As expected when one uses softer tubing, the solvent compressibility is balanced with a much lower volume.

The four capillary bridge viscometer has been used for years as an on-line chromatography detector. However many researchers have suffered with limited sensitivity due to pick-up from pump pulses and other parasitic noise sources. Until now, the fundamental promise of the bridge design to reject pump pulses has only partially been realized. With this innovative and inexpensive improvement to the bridge design, one can enhance the sensitivity to low concentration, low viscosity samples and continue to achieve high quality data even when using inexpensive pumps.

As will be evident to those skilled in the arts of viscometric measurements, macromolecular characterization, and chromatography, there are many obvious variations of the methods and devices of my invention that do not depart from the fundamental elements listed for their practice; all such variations are but obvious implementations of the invention described hereinbefore and are included by reference to our claims, which follow.

What is claimed is:
1. A capillary bridge viscometer comprising:
   a bridge to receive a solvent delivered to the bridge by a pump system comprising;
      a first arm comprising a first pair of series connected sensing capillaries, a second arm comprising
    a second pair of series connected sensing capillaries, and
    a delay volume connected in series between the second pair of series connected sensing capillaries,
    wherein the second arm is connected in parallel with the first arm,
a first differential pressure transducer coupled across the first arm and the second arm,
    such that the first differential pressure provides a measurement of first amplitudes of pressure pulses generated in the solvent by the pump system wherein the first differential pressure transducer is coupled to the first arm at a first junction between each of the first pair of series connected sensing capillaries, and
    such that the first differential pressure transducer is coupled to the second arm at a second junction between one of the second pair of series connected sensing capillaries and the delay volume, and
a pressure compensation volume between the first junction and to the first differential pressure transducer to transmit pressure to the first differential pressure transducer,
    wherein the pressure compensation volume comprises capillary tubing;
a second differential pressure transducer providing a measurement of second amplitudes of pressure pulses generated in the solvent by the pump system where the second differential pressure transducer is connected in parallel with the first arm and the second arm; and
wherein a length of the capillary tubing of the pressure compensation volume is sized such that a fluid volume of the pressure compensation volume matches a fluid volume of the delay volume to balance compressibility of fluid in the delay volume by maximizing a suppression ratio where the suppression ratio is defined by peak amplitudes among the second measured pressure pulse amplitudes divided by peak amplitudes among the first measured pressure pulse amplitudes, resulting in a minimizing of the amplitudes of pressure pulses generated in the solvent by the pump system.

2. The capillary bridge viscometer of claim 1 wherein the tubing comprises stainless steel.

3. The capillary bridge viscometer of claim 1 further comprising a valve connected to the pressure compensation volume to permit the volume to be flushed by fluid passing through the first arm.

\* \* \* \* \*